(12) United States Patent
Deshmukh et al.

(10) Patent No.: US 11,901,927 B2
(45) Date of Patent: Feb. 13, 2024

(54) DYNAMIC RANGE EXTENSION OF RADIO FREQUENCY SIGNALS USING PHASING OF TWO OR MORE IQ CHANNELS

(71) Applicant: NATIONAL INSTRUMENTS CORPORATION, Austin, TX (US)

(72) Inventors: Nikhil Ashok Deshmukh, Bangalore (IN); Michael Loehning, Dresden (DE)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 17/713,587

(22) Filed: Apr. 5, 2022

(65) Prior Publication Data
US 2023/0268947 A1 Aug. 24, 2023

(30) Foreign Application Priority Data
Feb. 18, 2022 (IN) .............................. 202241008720

(51) Int. Cl.
*H04B 1/16* (2006.01)
(52) U.S. Cl.
CPC ...................................... *H04B 1/16* (2013.01)
(58) Field of Classification Search
CPC ....................................................... H04B 1/16
See application file for complete search history.

(56) References Cited

U.S. PATENT DOCUMENTS

| | | | |
|---|---|---|---|
| 6,204,790 B1 | 3/2001 | Jin et al. | |
| 2011/0134337 A1* | 6/2011 | Takiguchi | H04N 5/455 348/731 |
| 2016/0088337 A1* | 3/2016 | Reddy | H04N 21/6143 348/731 |
| 2023/0012020 A1* | 1/2023 | Jiang | H02J 7/00034 |

OTHER PUBLICATIONS

P. M. Cruz and N. B. Carvalho, "Enhanced architecture to increase the dynamic range of SDR receivers," 2011 IEEE Radio and Wireless Symposium, Phoenix, AZ, 2011, pp. 331-334.

* cited by examiner

*Primary Examiner* — Janice N Tieu
(74) *Attorney, Agent, or Firm* — Kowert, Hood, Munyon, Rankin & Goetzel P.C.; Jeffrey C. Hood

(57) ABSTRACT

Dynamic range of radio frequency transmitters and receivers may be improved via a multiple-channel phasor configuration in which channels are phased in a manner that distributes the local oscillator phases over $\pi/2$ radians. A multiple-channel phasing receiver may include a power splitter to split an input signal into multiple signals, and may further include multiple single-channel receivers providing intermediate signals. Each single-channel receiver may have an input that receives a respective signal of the multiple signals, and may further have an output to provide a respective intermediate signal as a function of the respective input signal, a total gain applied to the respective input signal, a signal frequency of the local oscillator signal, and a respective phase of the local oscillator signal. The multiple-channel receiver may include a digital signal processor that combines the plurality of intermediate signals into a single output signal. A multiple-channel transmitter/transceiver may be similarly implemented.

20 Claims, 17 Drawing Sheets

DYNAMIC RANGE EXTENSION OF RADIO FREQUENCY SIGNALS USING PHASING OF TWO OR MORE IQ CHANNELS

PRIORITY CLAIM

This application claims benefit of priority to Indian Application No. 202241008720, titled "Dynamic Range Extension of Radio Frequency Signals Using Phasing of Two or More IQ Channels," filed Feb. 18, 2022, which is hereby incorporated by reference in its entirety as though fully and completely set forth herein.

FIELD OF THE INVENTION

The present invention relates to the field of instrumentation, including extending the dynamic range of RF signals through phasing two or more IQ channels.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Digital wireless communications are typically implemented through the use of modulators and demodulators, which provide a necessary RF (radio frequency) interface for systems such as cordless phones, wireless networks, and wireless peripheral devices for computers, in addition to test and control systems that may use a wireless interface to couple certain system elements. One commonly used modulation method that lends itself well to digital processes and is used in RF transmitters and receivers is "quadrature modulation", which employs two carriers out of phase by 90° and modulated by separate signals. This modulation technique is also referred to as "IQ Modulation", where "I" refers to the "in-phase" component of the waveform, and "Q" refers to the quadrature component, or 90°-out-of-phase component of the waveform. In its various forms, I/Q modulation provides an efficient way to transfer information, and also works well with digital formats. An I/Q modulator may be used for amplitude modulation (AM), frequency modulation (FM) and phase modulation (PM). There are also many digital encoding standards that allow for the transmission of vast amounts of data over wireless RF interfaces in shorter periods of time.

I/Q modulators and demodulators are key components of modern digital radio systems because they offer potentially higher levels of integration due to decreased reliance on high-Q filters as required by super-heterodyne systems. Additionally, I/Q modulation and demodulation is advantageous for systems with high increased instantaneous bandwidth (IBW) because twice the IBW can be achieved for the same sample rate as compared with super-heterodyne systems that employ intermediate frequency (IF) sampling. Unfortunately, I/Q modulators and demodulators also suffer from certain impairments such as DC offsets, I/Q mismatch, even-order distortion, flicker noise, and LO (local oscillator) leakage (from the LO port to the RF port) that can reduce the dynamic range of digital radio systems that employ them. Therefore, there is room for improvement in the dynamic range of RF transmitters and receivers.

Other corresponding issues related to the prior art will become apparent to one skilled in the art after comparing such prior art with the present invention as described herein.

SUMMARY OF THE INVENTION

The dynamic range of a radio frequency (RF) transmitter and/or an RF receiver may be improved by combining signals from multiple IQ channels that are phase shifted with respect to each other. In some embodiments, the signals in multiple channels—multiple transmit channels in the RF transmitter and/or multiple receive channels in the RF receiver—may be phase-shifted with respect to each other during mixing with a local oscillator signal by changing the respective phases of the local oscillator signals. Combining multiple phase-shifted IQ channels as described herein enables the design of RF transmitters, receivers, and/or transceivers with improved dynamic range.

Various embodiments of a proposed multiple-IQ-channel phasing receiver architecture disclosed herein are characterized by:

Any input phasor having a projection on at least two axes, orthogonal or non-orthogonal, is enough to reconstruct the input phasor. It should be noted that, as referenced in the present context, an axis represents a respective channel from among many I and Q channels of the receiver. When plotted on a phasor diagram, the receiver channels appear as axes with different phase rotations based on their local oscillator signal phase. In other words, each respective receiver channel appears as a corresponding axis having a different phase rotation based on its respective local oscillator signal phase.

With distributed phasing, the overall analog to digital converter (ADC) input signal range may be higher than the full-scale range of a single ADC by up 10 log(N) dB, without loss of signal information in the final output signal. For example, when the phasing is distributed uniformly, a 10 log(N) dB improvement may be achieved. Extending the range of the ADC input signal may improve signal-to-noise ratio (SNR) and the spurious free dynamic range (SFDR) of the receiver.

Combining projections from multiple axes provides additional SNR gain.

Various embodiments of a proposed multiple-IQ-channel phasing transmitter architecture disclosed herein are characterized by the phasing of the multiple transmitters enabling generation of an output signal of higher magnitude than an output signal generated without phasing.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
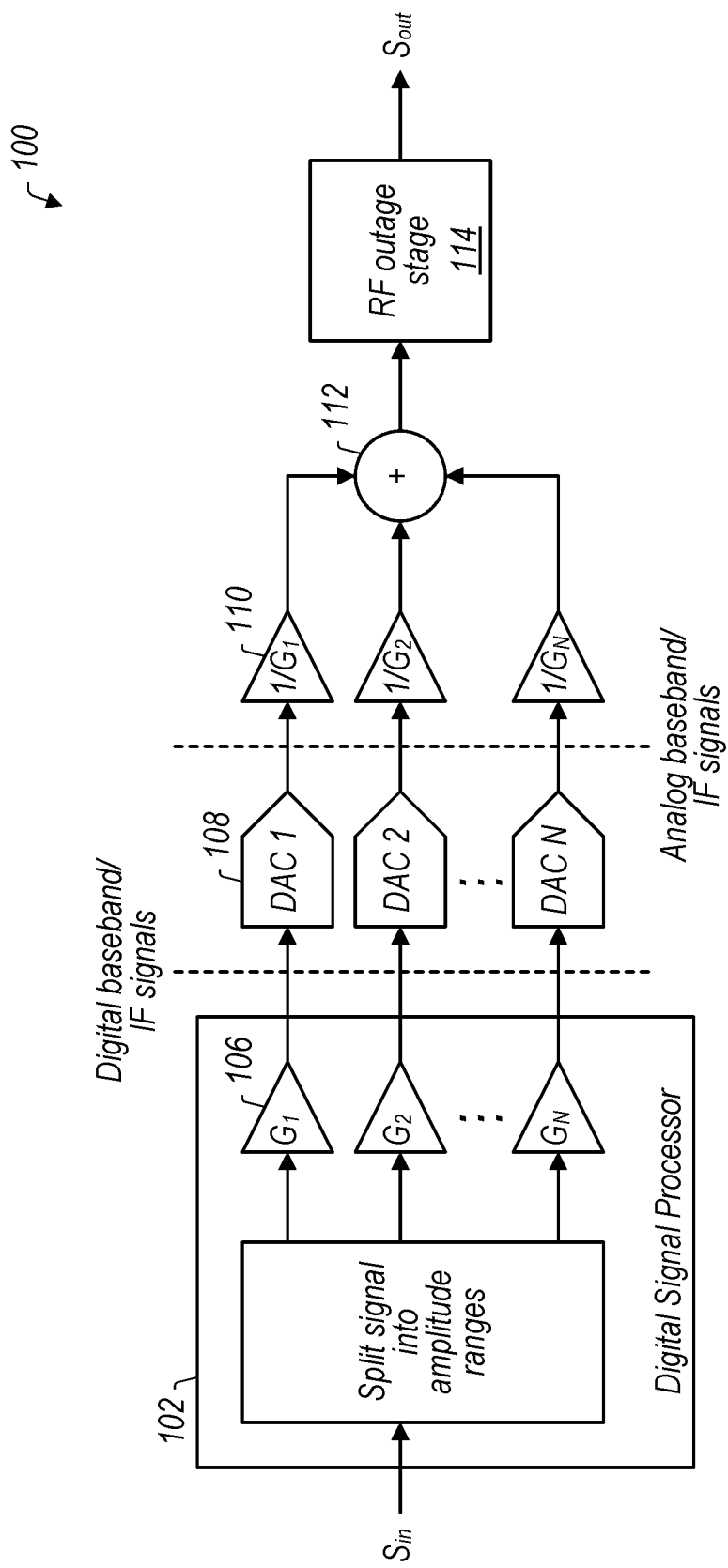
FIG. 1 shows the simplified circuit diagram of a high dynamic range transmitter using multiple baseband/IF channels with a common RF path.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

It is noted that the various terms or designations for circuits/components and signals as they appear herein, for example in such expressions as "switching circuit", "delay circuit", "source signal", "stimulus signal", "RF signal", etc. are merely names or identifiers used to distinguish among the different circuits/components and/or between different signals, and these terms are not intended to connote any specific meaning, unless directly indicated otherwise.

RF Transmitters and Receivers

As previously mentioned, I/Q modulators and demodulators used in RF transmitters and receivers may suffer from reduced dynamic range due to a variety of factors, which consequently results in RF transmitters and receivers operating at a reduced dynamic range. One widely used method to improve the dynamic range of RF devices has been the use of multiple channels, which generally involves the use of multiple channels such that the signals from individual channels are added coherently, while the noise signals undergo non-coherent addition. In some implementations, different channels apply different gains and/or direct current (DC) offsets to the signals. Such a multiple channel transmitter or receiver can be configured with multiple baseband/IF channels with a common RF path, or with multiple RF channels.

FIG. 1—Transmitter Using Multiple Baseband/IF Channels with a Common RF Path

FIG. 1 shows the simplified circuit diagram of a high dynamic range transmitter 100 that uses multiple baseband/IF channels with a common RF path. As shown in FIG. 1, a digital signal processor 102 is used to split the input signal into multiple signals of different amplitude ranges of the input signals. These signals may be given a gain to make optimal use of the dynamic range of the digital-to-analog converters (DACs) 108. The channel-specific gain 106 is indicated by $G_i$ for the corresponding channel i. The analog signals at outputs of the DACs are summed at 112 after undoing channel-specific gains 110. The resulting RF signal is provided at output stage 114. The digital-to-analog conversion in transmitter 100 results in a higher spurious-free dynamic range. It should be noted that spurious-free dynamic range refers to the strength ratio of the fundamental signal to the strongest spurious signal in the output, and is also defined as a measure used to specify analog-to-digital and digital-to-analog converters (ADCs and DACs, respectively) and radio receivers.

Figure 2:
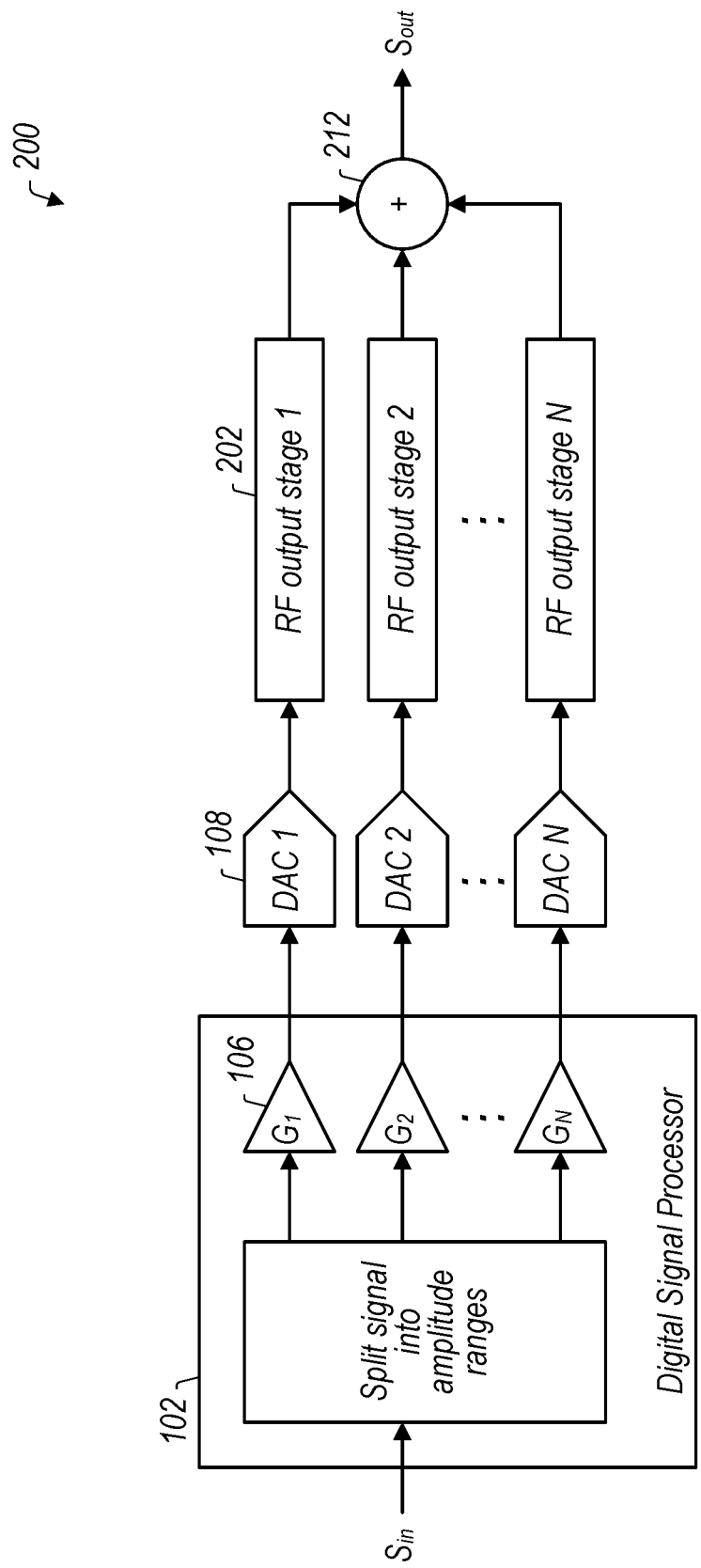
FIG. 2 shows the simplified circuit diagram of a high dynamic range transmitter using multiple RF channels.

FIG. 2—Transmitter Using Multiple RF Channels

FIG. 2 shows the simplified circuit diagram of a high dynamic range transmitter 200 that uses multiple RF channels. The method of using multiple baseband/IF channels with a common RF path (as illustrated in FIG. 1) can be extended to using multiple RF channels as shown in FIG. 2. In addition to common RF processing (frequency conversion, filtering), the RF output stages 202 are used to apply analog gains to signals in individual channels such that gain differences due to application of channel-specific gains $G_i$ 106 before digital-to-analog conversion 108 are removed before the signals are summed at 212 to produce the final RF output signal $S_{out}$.

Figure 3:
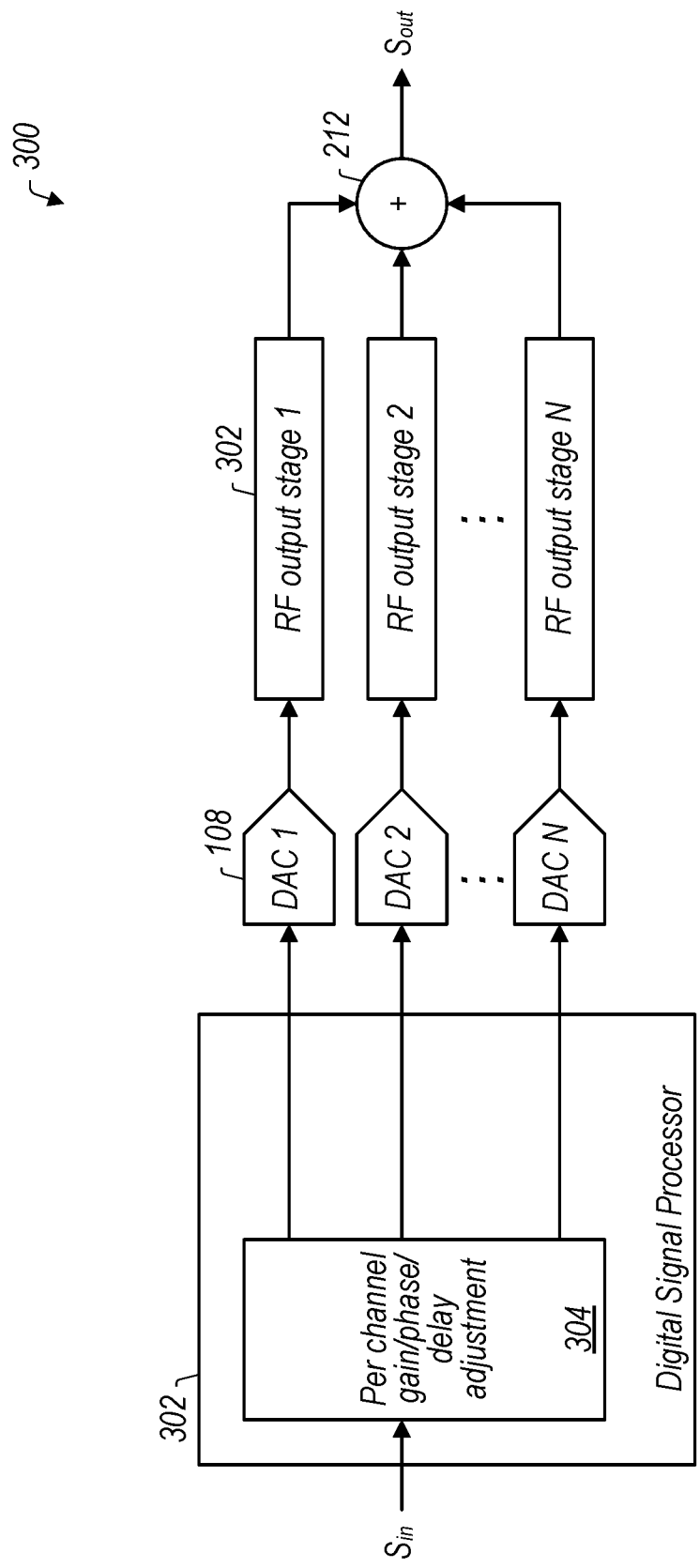
FIG. 3 shows the simplified circuit diagram of a coherent summation-based transmitter using multiple RF channels.

FIG. 3—Coherent Summation-Based Transmitter Using Multiple RF Channels

FIG. 3 shows the simplified circuit diagram of a coherent summation-based transmitter 300 that uses multiple RF channels. Identical signals may be provided to multiple identical baseband, intermediate frequency (IF), or RF channels and their outputs may be combined coherently, which is referred to as "channel summation". The approach is illustrated in FIG. 3, using multiple RF channels as an example. Digital Signal Processor 302 may include adjustment circuitry 304 that adjusts multiple channels for gain, phase and/or delay to compensate for potential differences of the non-ideal analog output channels, each analog output channel including a DAC 108 and an RF output stage 302. This ensures that the output signals provided by RF output stages 302 are combined coherently at summing node 212. This may all be performed digitally as shown in FIG. 3.

Figure 4:
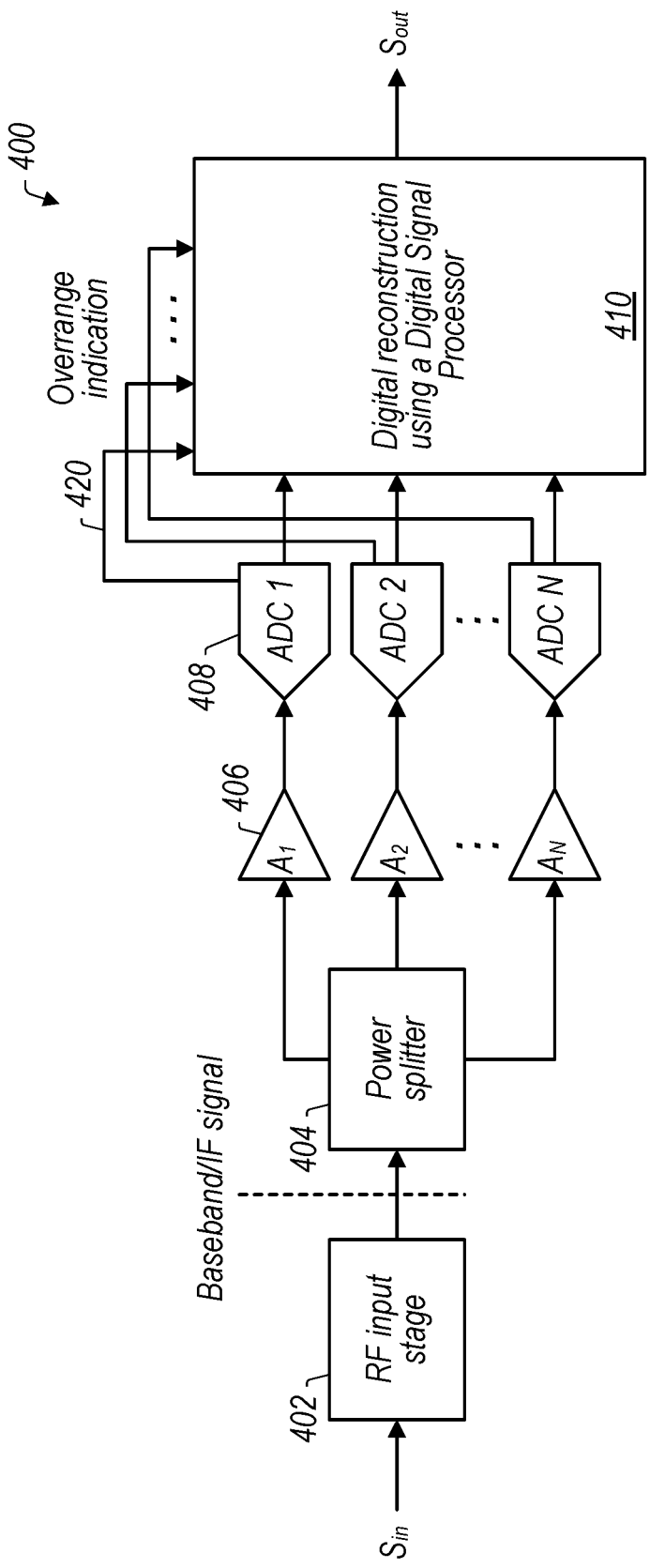
FIG. 4 shows the simplified circuit diagram of a high dynamic range receiver using multiple baseband/IF channels with a common RF path.

FIG. 4—Receiver Using Multiple Baseband/IF Channels with a Common RF Path

FIG. 4 shows the simplified circuit diagram of a high dynamic range receiver 400 that uses multiple baseband/IF channels with a common RF path. The RF input stage 402 provides a baseband/IF signal, which is split by power splitter 404 into N channels. Each of the analog signals is converted into a digital signal using a corresponding respective ADC (collectively referenced as 408) after applying a respective gain adjustment, either attenuation or gain, $A_i$ ($A_1$, $A_2$, ... $A_n$, are collectively referenced as 406) in the corresponding channel i. All digital signals are processed using a digital signal processor 410 to reconstruct the final signal output signal $S_{out}$. Signals at the input to the ADCs 408 may cause an overrange. A signal indicating an overrange (collectively referenced as 420) is therefore supplied to the digital signal processor 410 from each of the ADCs 408 in addition to the digital signal outputs of ADCs 408. Similar to the high-dynamic range transmitter described above with reference to FIG. 1, the different ADCs 408 operate on different amplitude ranges of the incoming signal. The ADC with the lowest attenuation is used to convert the lowest level signal parts with high resolution, while the ADC with the highest attenuation (lowest gain) is used for converting the high-level signal portions (or parts). Depending on the ADC overrange indications, the output of the non-overranged ADCs are selected and/or combined to reconstruct the input signal with the highest possible resolution.

Figure 5:
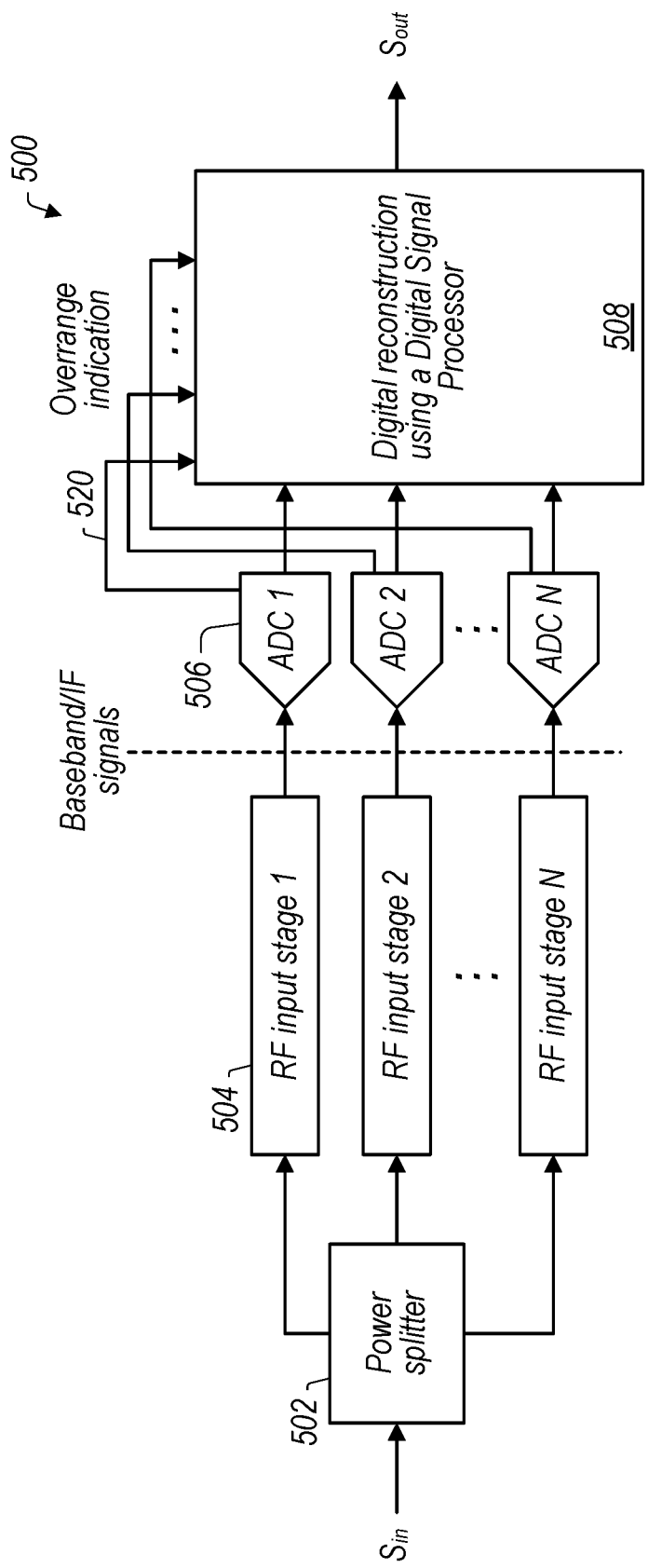
FIG. 5 shows the simplified circuit diagram of a high dynamic range receiver using multiple RF channels.

FIG. 5—Receiver Using Multiple RF Channels

FIG. 5 shows the simplified circuit diagram of a high dynamic range receiver 500 that uses multiple RF channels. The method of using multiple baseband/IF channels with a common RF path may be extended to use multiple RF channels as shown in FIG. 5. The input signal is split into multiple RF input stages 504 by power splitter 502. In addition to the common RF processing (frequency conversion, filtering), the RF input stages 504 are used to apply different analog gains to the signals fed into the different ADCs 506. The signal is reconstructed by digital signal processor 508 to produce the output signal $S_{out}$. Similar to receiver 400, signals at the input to the ADCs 506 may cause an overrange, and signal indicating an overrange (collectively referenced as 520) is therefore supplied to the digital signal processor 508 from each of the ADCs 506 in addition to the digital signal outputs of ADCs 506.

Figure 6:
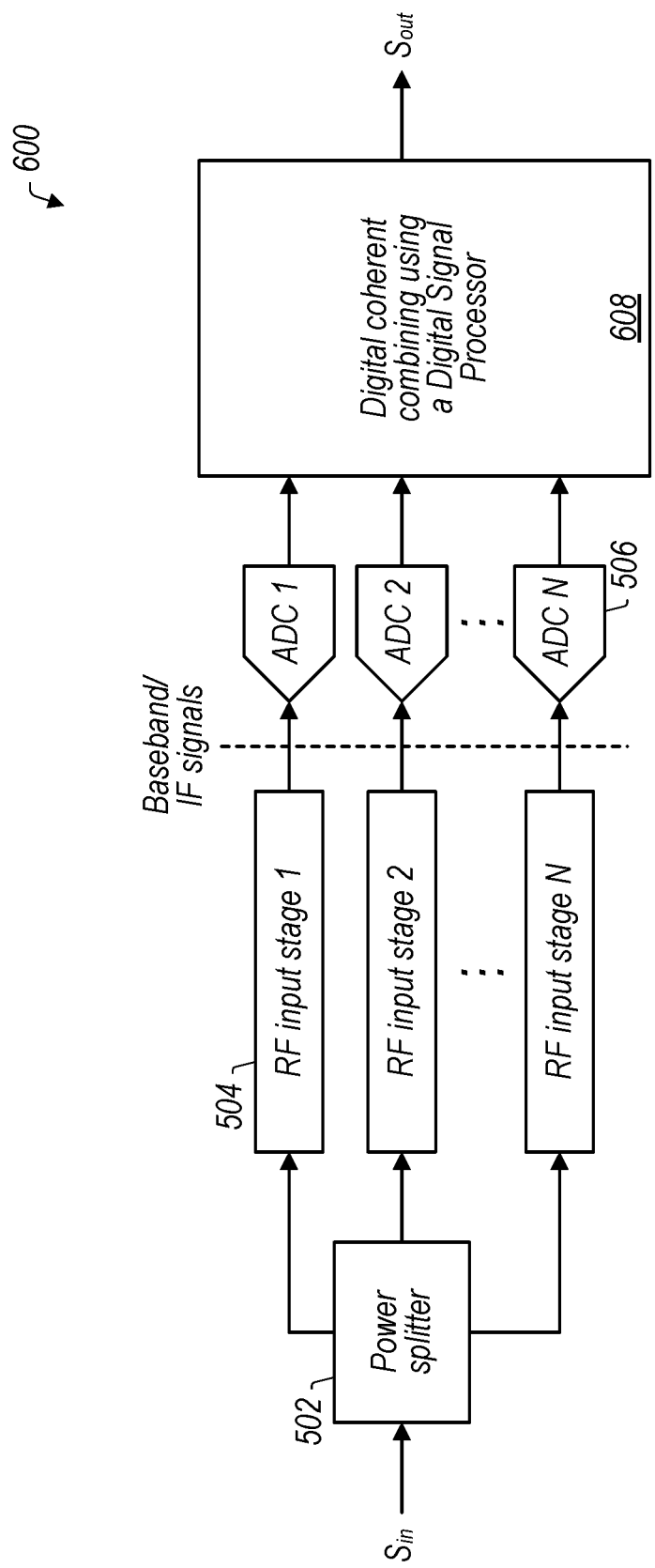
FIG. 6 shows the simplified circuit diagram of a coherent combining receiver with multiple RF channels.

FIG. 6—Coherent Combining Receiver Using Multiple RF Channels

FIG. 6 shows the simplified circuit diagram of a coherent combining receiver 600 that uses multiple RF channels. If the different baseband, IF, or RF channels of the multi-channel receiver described above all apply the same attenuation or gain, we get a special case of coherent receiver channel summation. This is similar to the coherent summation-based approach for the transmitter discussed with reference to FIG. 3. The digital outputs from multiple baseband channels, IF channels, or RF channels (all provided with the same input signal) are simply summed in the DSP 608.

In order to provide improvements over the transmitters and receivers illustrated in FIGS. 1-6, a multiple-IQ-channel phasing transmitter and receiver design is proposed.

Multiple-IQ-Channel Phasing Receiver

Figure 7:
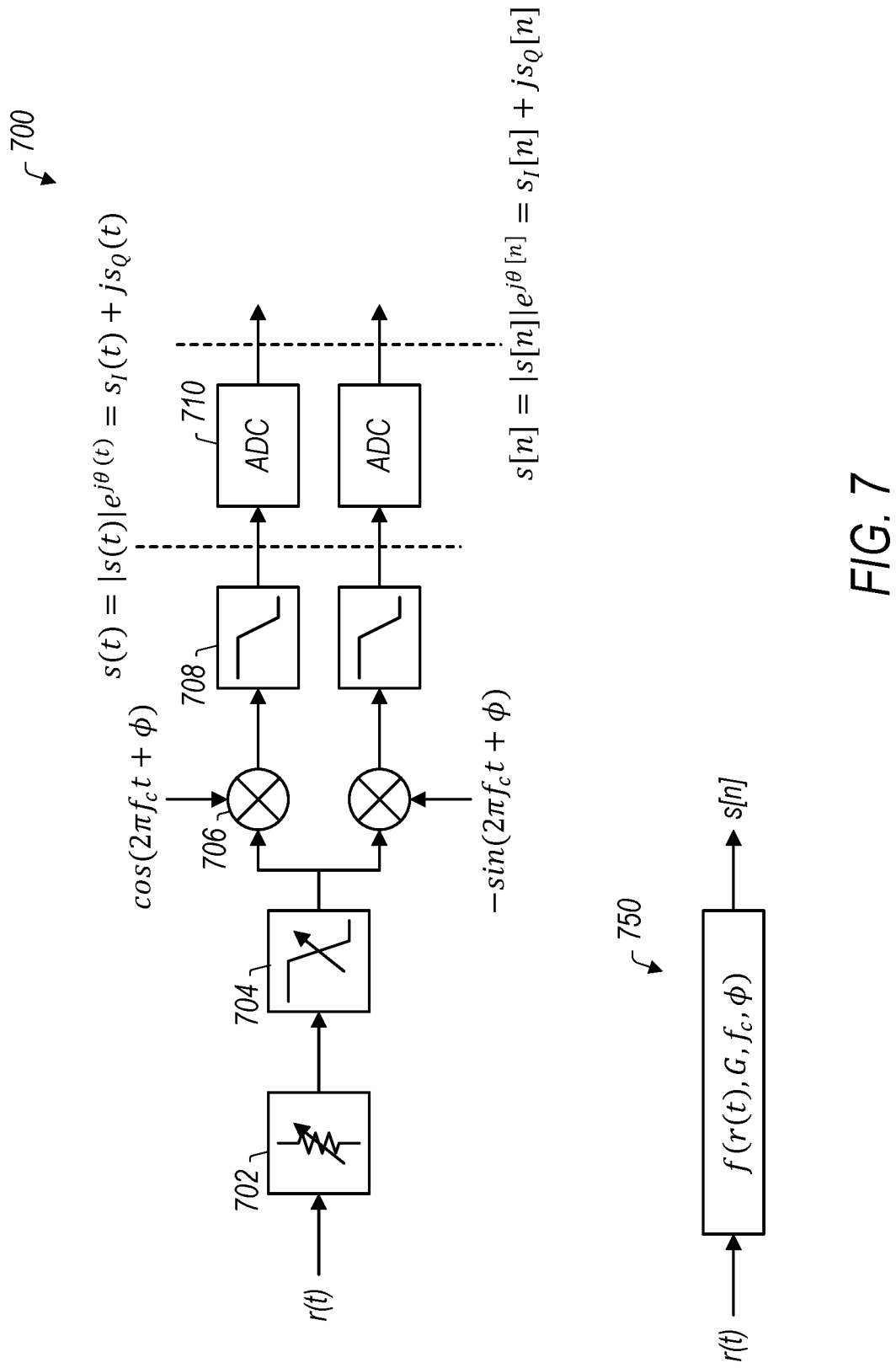
FIG. 7 shows the simplified circuit diagram and a functional representation of a single IQ channel receiver.

A single-IQ-channel receiver 700 (corresponding to functional representation 750), as shown in FIG. 7, may be considered. The output s[n] of the receiver is a function of: the received signal r(t), the total gain G applied to the input signal, local oscillator signal's frequency fe, and local oscillator signal's phase $. The total gain G applied to the received signal r(t) is such that the signal s(t) at the input of the ADCs 710 makes optimal use of the dynamic range of the ADC without over-ranging the ADCs 710. The receiver 700 may use a direct-conversion architecture, including signal-gain control circuit 702, RF filtering circuit 704, mixers 706, and low pass filters 708, but alternate embodiments may use a heterodyne receiver with a non-zero IF or a heterodyne receiver where the last stage uses a zero IF. For example, the design of receiver 700 may also apply to complex signals centered around a (low) non-zero IF. In some embodiments, filtering circuit 704 may represent a bank of RF filters, and signal-gain control circuit may represent a cascade of power amplifiers and variable attenuators.

Figure 8:
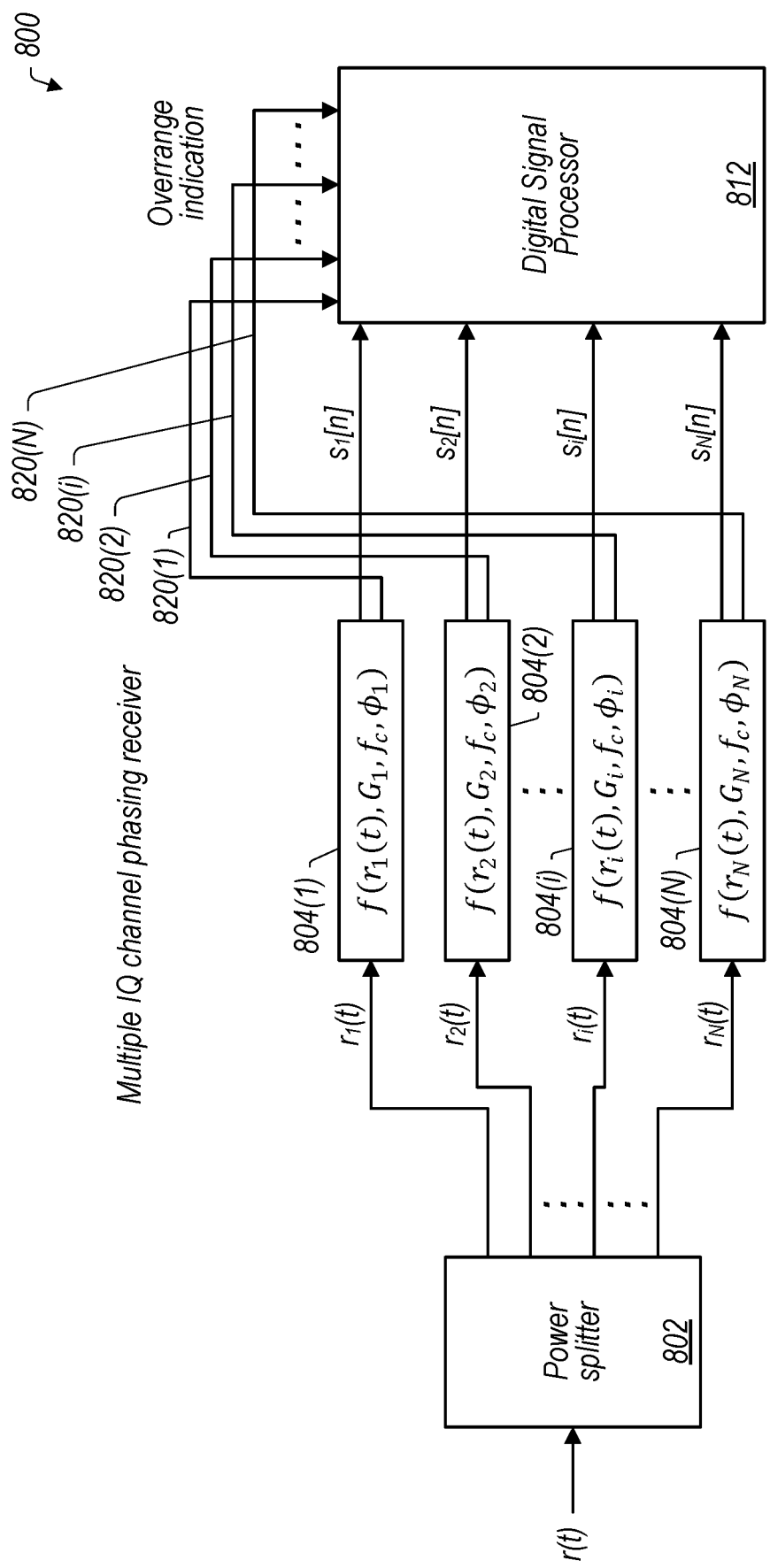
FIG. 8 shows the simplified circuit diagram of a multiple-IQ-channel phasing receiver, according to some embodiments.

The performance of the single-IQ-channel receiver 700 may now be compared to the multiple-IQ-channel phasing receiver 800 shown in FIG. 8. N represents the number of IQ channels. The input signal r(t) is split by power splitter 802 into multiple signals $r_1(t) \ldots r_i(t) \ldots r_N(t)$. Every ith signal $r_i[t]$ at the output of the power splitter 802 is processed by its own single-channel receiver 804(i) whose digital signal output $s_i[n]$ is a function of at least $r_i[t]$ and local oscillator phase $\phi_i$. As illustrated in FIG. 8, $s_i[n]$ is a function of input signal $r_i(t)$, gain $G_i$, carrier frequency $f_c$ and local oscillator phase $\phi_i$. The output signals are all provided to DSP 812. Since an input signal to an individual ADC within a single-channel receiver may cause an overrange, a respective signal indicating an overrange (signals 820(1), 820(2) ... 820(i) ... 820(N)) may therefore be supplied to the digital signal processor 812 from each of the single-channel receivers in addition to the signal outputs $s_i[n]$. The receiver 800 uses phasing of the IQ channels, such that local oscillator phases $\phi_i$ are distributed over $\pi/2$ radians. In some embodiments, the phases $\phi_i$ may be distributed uniformly over $\pi/2$ radians, while in some embodiments the distribution may not be even.

$$\phi_i = \frac{\pi}{2N}(i-1) + \phi_0, \quad i = 1, 2, \ldots N;$$

where $\phi_0$ denotes an arbitrary starting phase.

All receivers 804 may apply a gain such that the gain compensates for the loss due to the power splitter. An additional gain, $G_a$ of maximum 10 log(N) dB may be applied. $L_i$ represents the insertion loss of the power splitter on the output port i.

$$G_i, dB = G + L_i + G_a$$

The additional gain $G_a$ may cause the signal to over-range some of the ADCs. However, the signal may be reconstructed, as further detailed below.

Figure 9:
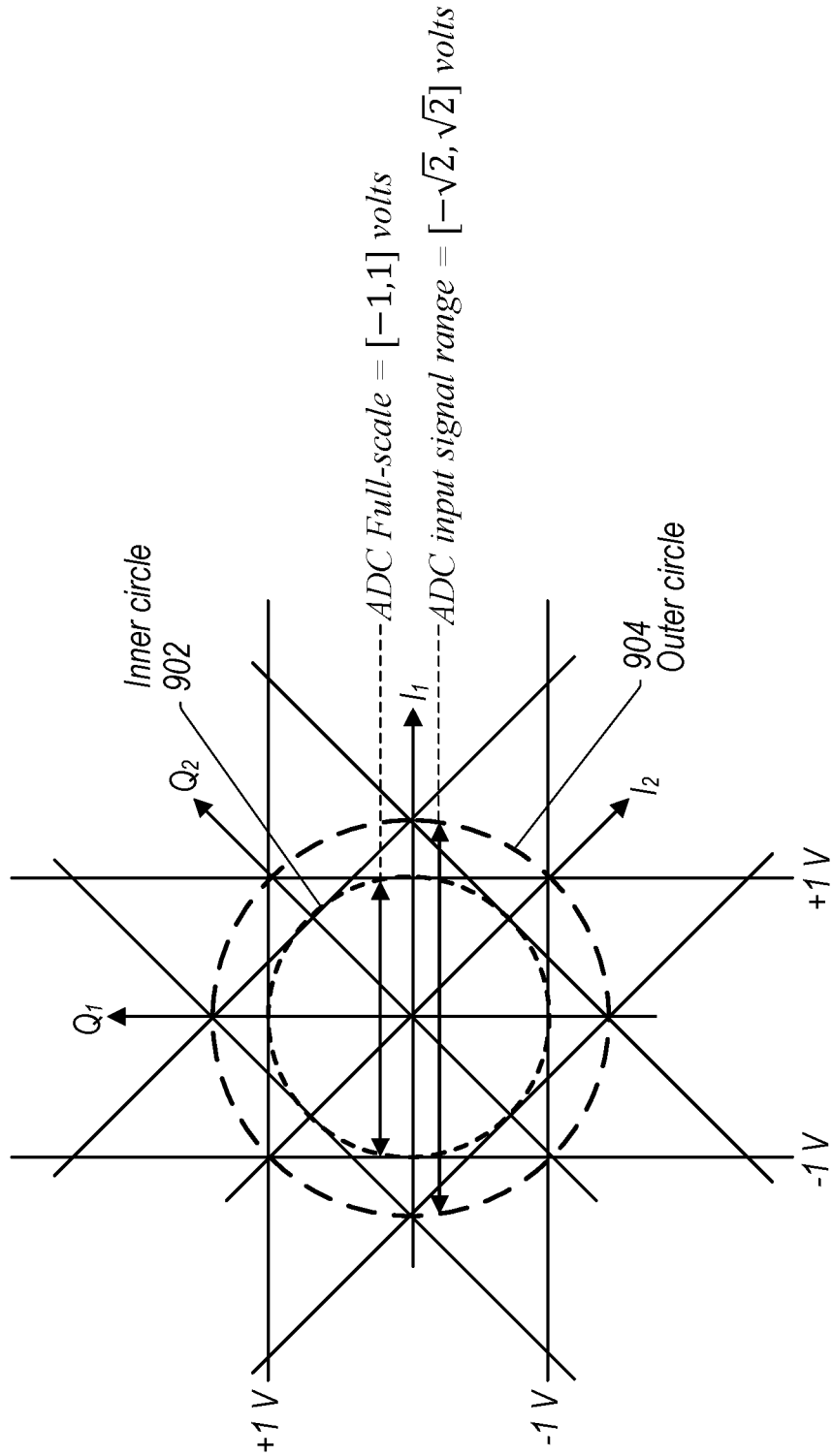
FIG. 9 shows a diagram illustrating the phasor plane of a two-IQ-channel phasing receiver, according to some embodiments.
Figure 10:
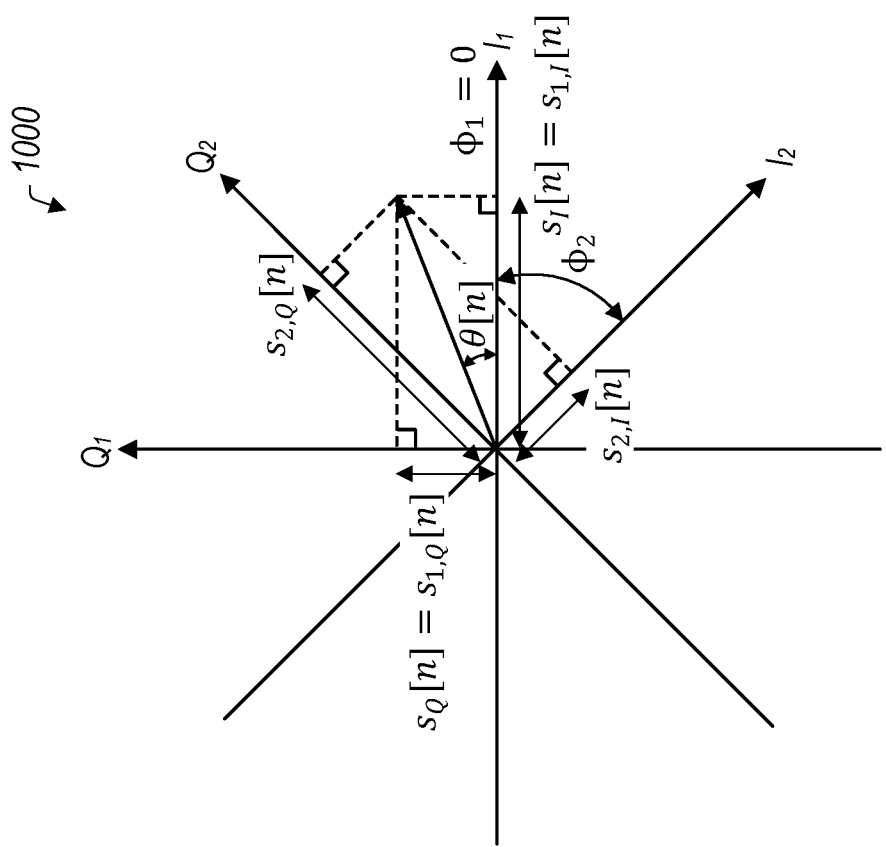
FIG. 10 shows a diagram illustrating phasor projections in a two-IQ-channel phasing receiver for $\phi_1=0$ with the noise terms ignored, according to some embodiments.

Considering a multiple IQ channel phasing receiver with two IQ channels (other embodiments may of course include additional IQ channels; two IQ channels are illustrated for the sake of simplicity and clarity), if the ADC full-scale is [−1,1] volts, each IQ channel may successfully receive a phasor with arbitrary phase and magnitude less than or equal to 1 volt. This is indicated as the inner circle 902 in FIG. 9. By applying the phasing technique, it is possible for the input phasor to have maximum magnitude of $\sqrt{2}$ volts. Such a phasor lies within the outer circle 904 in FIG. 9. Considering an I or a Q channel as an axis (e.g., axes $I_1$, $I_2$, $Q_1$, and $Q_2$ in FIG. 9), everywhere within outer circle 904 any input phasor has projections on all four axes (the two I channels and two Q channels referenced above), but at least two of those do not over-range the ADC, making reconstruction of the input phasor possible. This is illustrated in FIG. 10, which shows a diagram illustrating phasor projections in a two-IQ-channel phasing receiver for $\phi_1=0$ with the noise terms ignored. The signal outputs from the multiple IQ channels (804, in reference to FIG. 8) may be combined using digital signal processing to faithfully reconstruct a digital representation of the input signal. Each component receiver 804(*i*) returns a complex-baseband signal:

$$s_i[n]=|s_i[n]|e^{j\Theta i}[n]=s_{i,I}[n]+js_{i,Q}[n]+\tilde{w}_{i,I}[n]+j\tilde{w}_{i,I}[n]$$

where $\tilde{w}_{i,j}$ and $\tilde{w}_{i,Q}$ are additive white Gaussian noise random variables.

In reference to FIG. 10, the projections on the different axes may be expressed as:

$$s_{i,I}[n] = |s[n]| \cos(\theta[n] + \phi_i) + \tilde{w}_{i,I}[n]$$
$$= |s[n]| \{\cos(\theta[n])\cos(\phi_i) - \sin(\theta[n])\sin(\phi_i)\} + \tilde{w}_{i,I}[n]$$
$$= s_I[n]\cos(\phi_i) - s_Q[n]\sin(\phi_i) + \tilde{w}_{i,I}[n]$$
$$s_{i,Q}[n] = |s[n]| \sin(\theta[n] + \phi_i) + \tilde{w}_{i,Q}[n]$$
$$= |s[n]|\{\sin(\theta[n])\cos(\phi_i) + \cos(\theta[n])\sin(\phi_i)\} + \tilde{w}_{i,Q}[n]$$
$$= s_I[n]\sin(\phi_i) + s_Q[n]\cos(\phi_i) + \tilde{w}_{i,Q}[n]$$

where $s[n] = s_I[n] + js_Q[n]$.

If none of the projections get clipped when digitized using the ADCs, the received sample, s may be computed by solving the following set of linear equations:

$$\begin{bmatrix} s_{1,I}[n] \\ s_{1,Q}[n] \\ s_{2,I}[n] \\ s_{2,Q}[n] \\ \vdots \\ s_{N,I}[n] \\ s_{N,Q}[n] \end{bmatrix} = \begin{bmatrix} \cos(\phi_1) & -\sin(\phi_1) \\ \sin(\phi_1) & \cos(\phi_1) \\ \cos(\phi_2) & -\sin(\phi_2) \\ \sin(\phi_2) & \cos(\phi_2) \\ \vdots & \vdots \\ \cos(\phi_N) & -\sin(\phi_N) \\ \sin(\phi_N) & \cos(\phi_N) \end{bmatrix} \begin{bmatrix} s_I[n] \\ s_Q[n] \end{bmatrix} + \begin{bmatrix} \tilde{w}_{1,I}[n] \\ \tilde{w}_{1,Q}[n] \\ \tilde{w}_{2,I}[n] \\ \tilde{w}_{2,Q}[n] \\ \vdots \\ \tilde{w}_{N,I}[n] \\ \tilde{w}_{N,Q}[n] \end{bmatrix}$$

If certain projections do get clipped, they may be removed from the above set of linear equations (e.g., upon receiving a corresponding overrange indication, digital signal processor 812 may perform the computations without the clipped projection). The received sample may be computed correctly if there are at least two equations (rank 2 matrix), e.g., when at least two projections do not get clipped. To solve the resulting set of linear equations, standard techniques like application of the Moore-Penrose pseudoinverse, MMSE techniques, etc. may be used.

Pursuant to the above, a multiple-IQ-channel phasing receiver as disclosed herein may be characterized by the following:

Having an input phasor that has a projection on at least two axes, orthogonal or non-orthogonal, may be enough to reconstruct the input phasor.

With distributed phasing, the overall ADC input signal range may be higher than a single ADC full-scale range by up to 10 log(N) dB, without loss of signal information in the final output signal. For example, when the phasing is distributed uniformly, a 10 log(N) dB improvement may be achieved. Extending the range of the input signal at the ADC may improve signal-to-noise ratio (SNR) and the spurious-free dynamic range (SFDR) of the receiver.

Combining projections from multiple axes may result in additional SNR gain.

Multiple-IQ-Channel Phasing Transmitter

Figure 11:
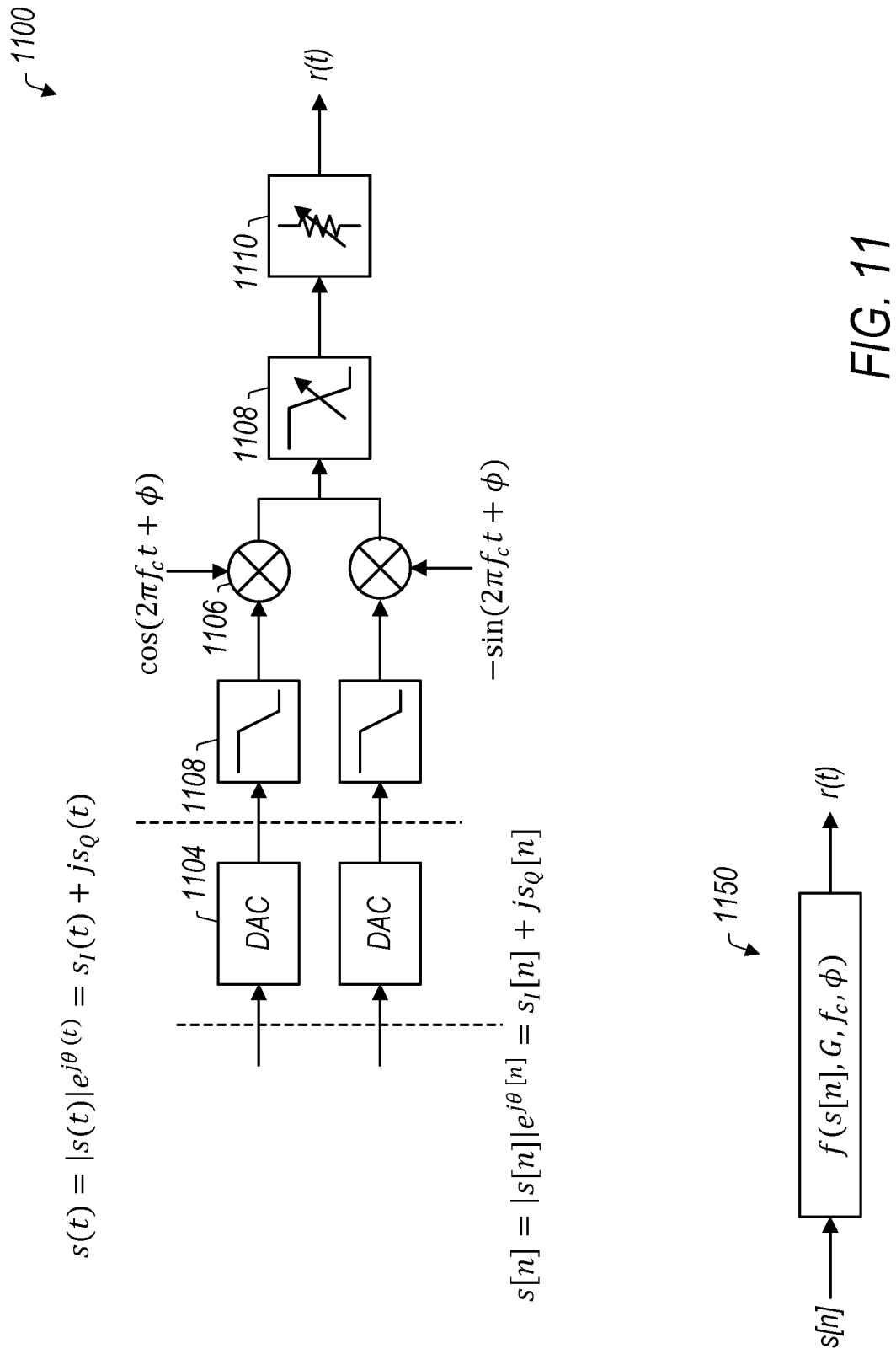
FIG. 11 shows the simplified circuit diagram and a functional representation of a single-IQ-channel transmitter.

A single-IQ-channel transmitter 1100 (corresponding to functional representation 1150), as shown in FIG. 11, may be considered. The output r(t) of the transmitter is a function of: the input digital signal s[n], the total gain G applied to the input signal, local oscillator signal's frequency $f_c$, and local oscillator signal's phase ϕ. The input digital signals to the DACs 1104 make optimal use of the dynamic range of the DAC. The transmitter 1100 may use a direct-conversion architecture, similar to that illustrated in FIG. 7, with low pass filters 1108, mixers 1106, RF filtering circuit 1108, and signal-gain control circuit 1110, but alternate embodiments may use a heterodyne transmitter with the first stage using a non-zero IF or a heterodyne receiver where the first stage using a zero IF. For example, the design of transmitter 1100 may also apply to complex signals centered around a (low) non-zero IF.

Figure 12:
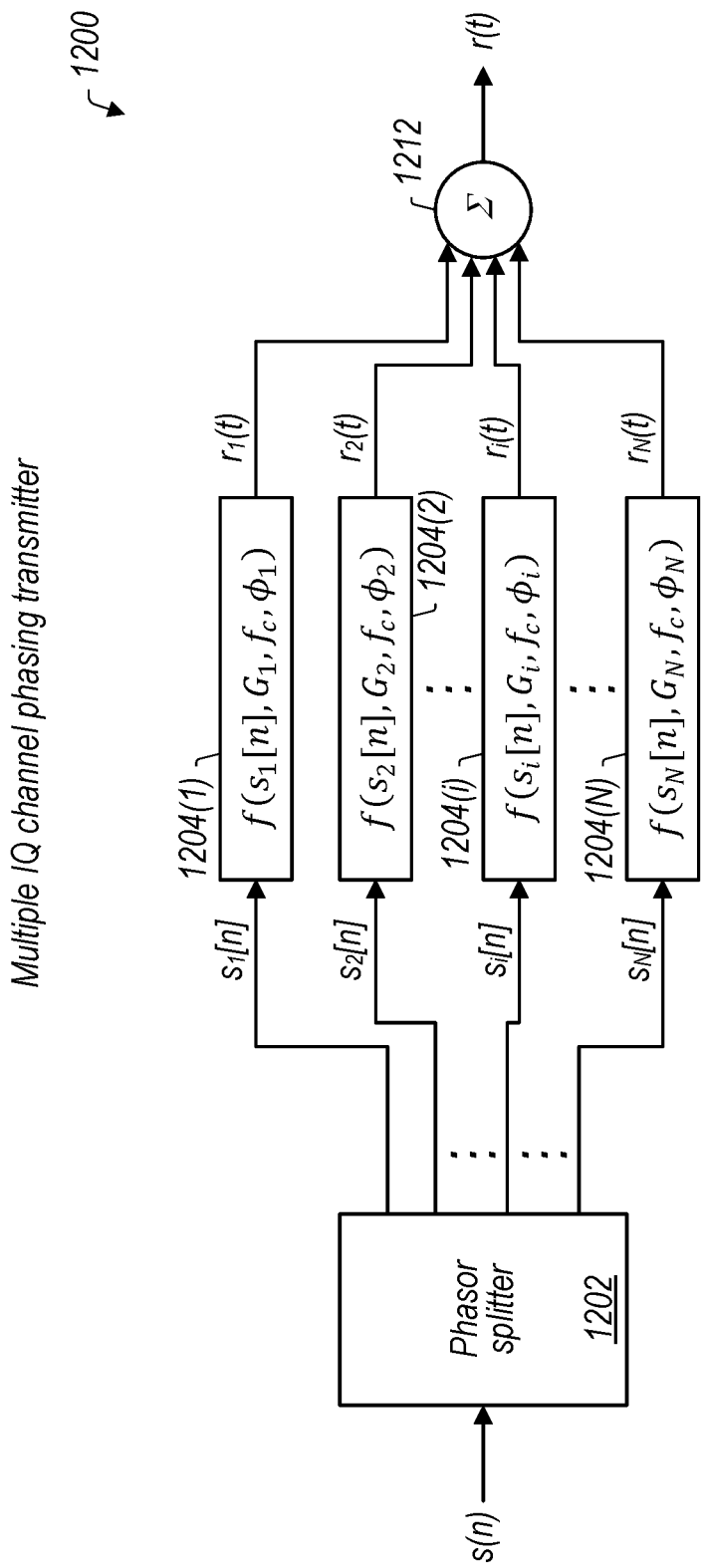
FIG. 12 shows the simplified circuit diagram of a multiple-IQ-channel phasing transmitter, according to some embodiments.

A multiple-IQ-channel phasing transmitter 1200 is illustrated in FIG. 12. The phasing of the multiple transmitters 1204 enables generation of an output signal of higher magnitude than an output signal generated without such phasing. The digital signal processor (or phasor splitter) 1202 splits each digital I/Q sample of the input signal s[n] into N digital I/Q samples. This process is referred to herein as phasor splitting. Phasor splitting may be performed in the analog domain or the digital domain. Every ith signal $s_i$ [n] at the output of the phasor splitter 1202 is processed by its own single-channel transmitter 1204(*i*) whose RF output $r_i$(t) is a function of at least input signal $s_i$[n] and the local oscillator phase $\phi_i$. As illustrated in FIG. 12, the RF output $r_i$(t) is a function of input signal $s_i$[n], analog gain $G_i$, carrier frequency $f_c$, and local oscillator phase $\phi_i$. The multiple IQ channel phasing transmitter uses phasing of the IQ channels, such that local oscillator phases $\phi_i$ are distributed over π/2 radians. In some embodiments, the phases $\phi_i$ may be distributed uniformly over π/2 radians, while in some embodiments the distribution may not be even.

$$\phi_i = \frac{\pi}{2N}(i-1) + \phi_0, \quad i = 1, 2, \dots N;$$

where $\phi_0$ denotes an arbitrary starting phase. The multiple output signals $r_i$(t) from 1204(1, 2 . . . i . . . N) are summed at 1212 to produce output signal r(t).

Figure 13:
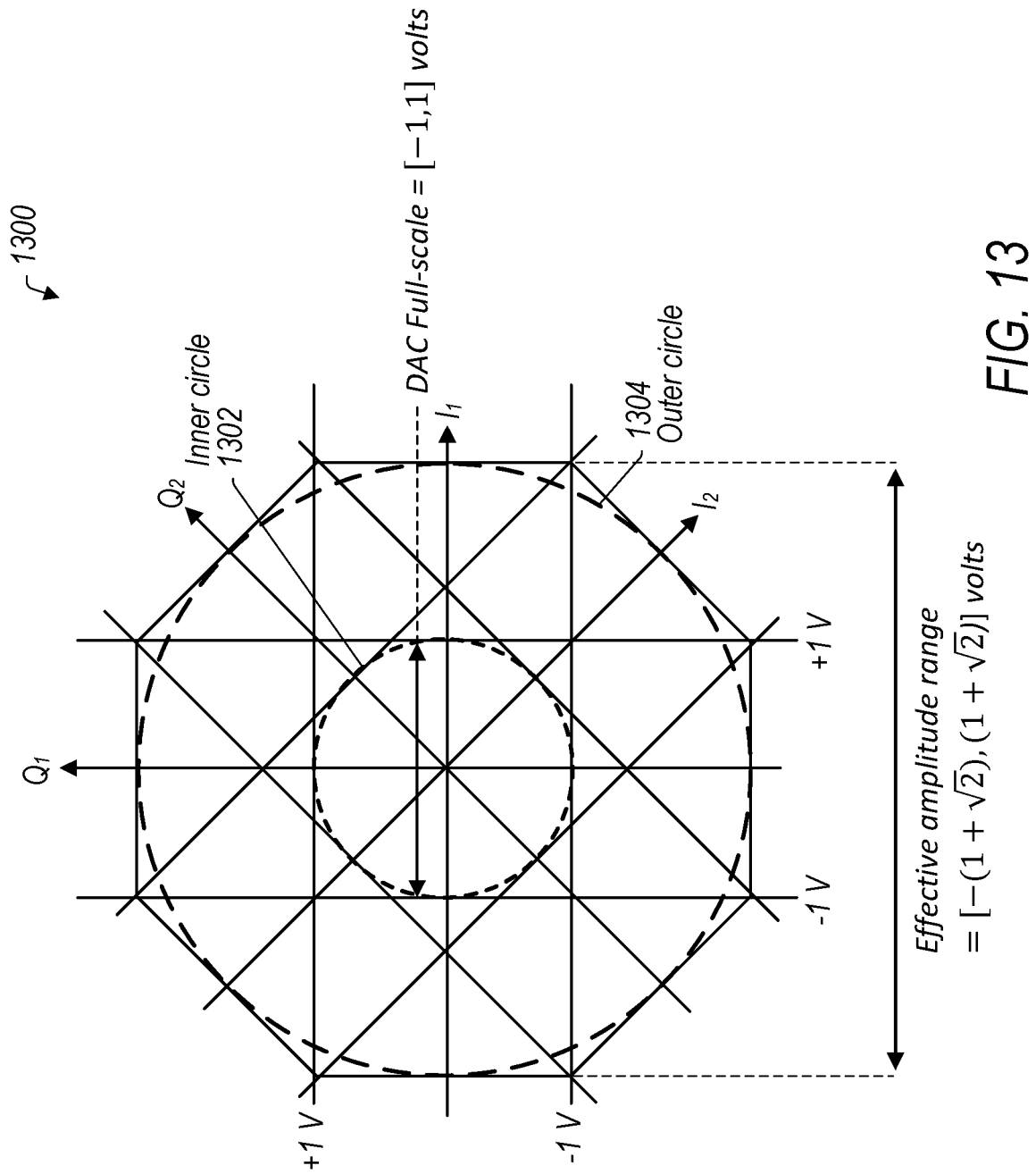
FIG. 13 shows a diagram illustrating the phasor plane of a two-IQ-channel phasing transmitter, according to some embodiments.
Figure 14:
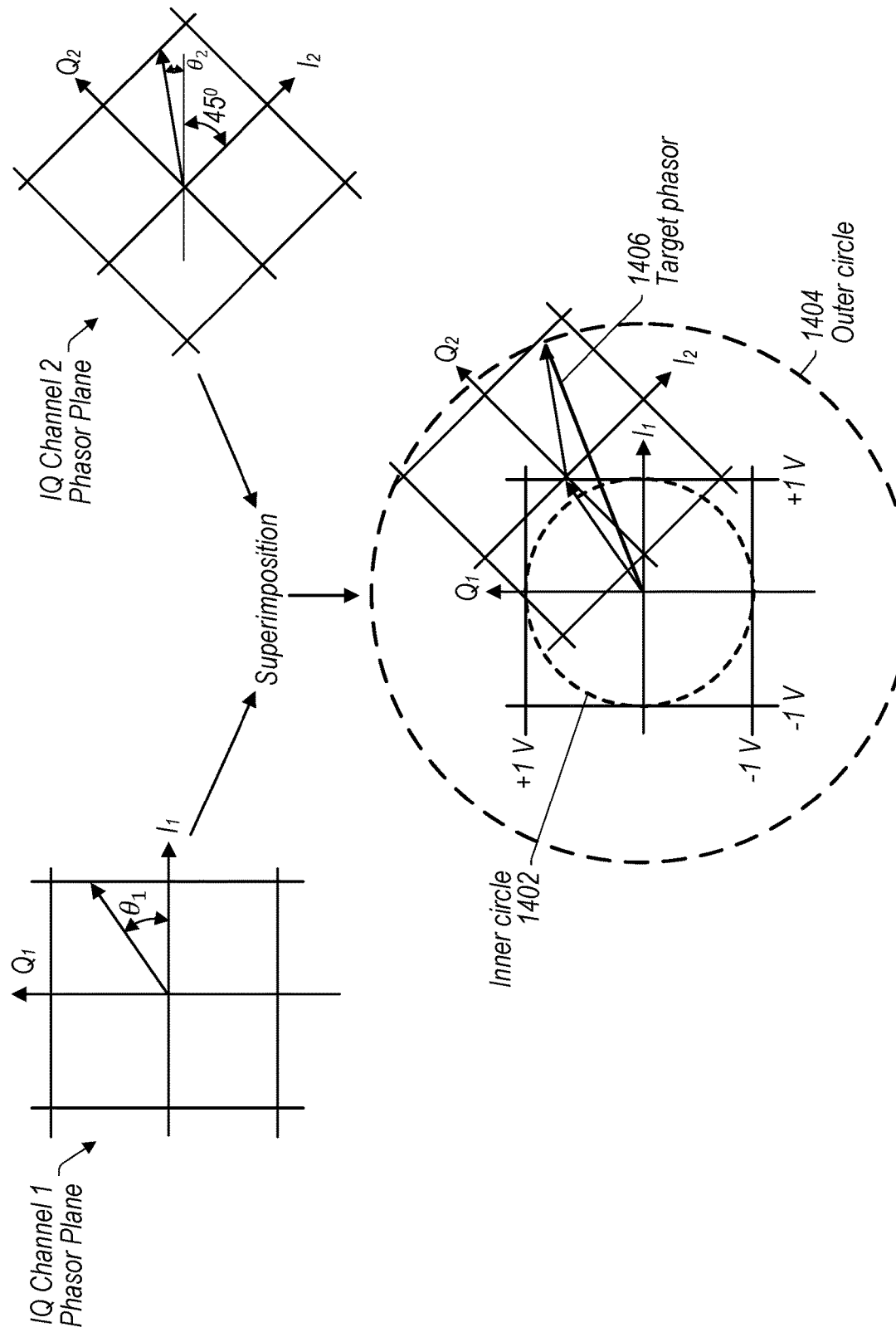
FIG. 14 shows a diagram illustrating phasor splitting in a two-IQ-channel phasing transmitter, according to some embodiments.
Figure 15:
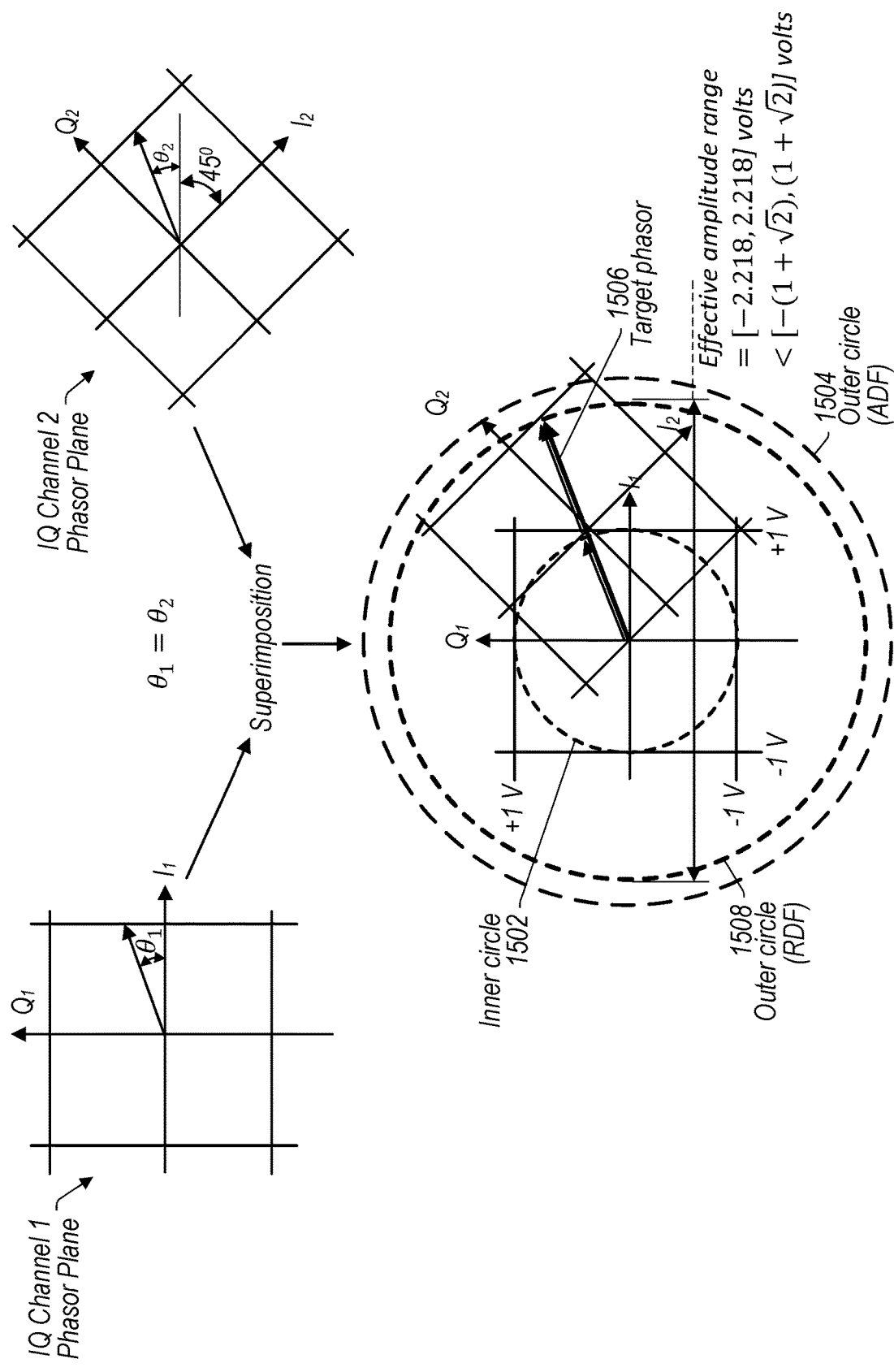
FIG. 15 shows a diagram illustrating a method that uses reduced degrees of freedom for phasor splitting in a two-IQ-channel phasing transmitter, according to some embodiments.

The maximum possible output signal range through a 2-IQ-channel example (featuring channels 1 and 2) is illustrated in FIGS. 13-15. In the illustrated example, the local oscillator phase of channel 2 leads the local oscillator phase of channel 1 by 45°. Assuming that each DAC (1104 in reference to FIG. 11) has an output amplitude range of [−1, 1] volts, as indicated by the Inner Circle 1302 in FIG. 13, and the outputs from the two channels are added in the analog domain at RF, the entire system behaves as a single channel transmitter with a resultant effective amplitude range at DAC output of [−(1+√2), (1+√2)] volts, as indicated by the Outer Circle 1304 in FIG. 13. This is higher than the resultant range of [−2, 2] volts if the local oscillator phases of both IQ channels are aligned, as it happens in a coherent summation-based transmitter described earlier with respect to FIG. 3. FIG. 14 shows a diagram illustrating phasor splitting in a two-IQ-channel phasing transmitter, providing an indication of how phasor splitting may be implemented. The target phasor may be split into phasors of individual IQ channels such that result of their addition in analog domain at RF corresponds to the target phasor.

The phasor splitting method described above may result in individual phasors that may not be aligned in phase, and may be referred to as the All Degrees of Freedom (ADF) method, as it makes use of both degrees of freedom—phase and magnitude. Another method of phasor splitting may generate individual phasors always aligned in phase. However, such a method may be considered sub-optimal in terms of the maximum possible output signal range, and may be referred to as the Reduced Degrees of Freedom (RDF) method, as it restricts one degree of freedom, for example the phase. FIG. 15 shows a diagram illustrating a method that uses reduced degrees of freedom for phasor splitting in a two-IQ-channel phasing transmitter. For the example illustrated in FIG. 15, the resultant effective amplitude range was found to be [−2.218, 2.218] volts. In contrast to the example illustrated in FIG. 14, there are two outer circles, an outer circle 1508 corresponding to the RDF method and an outer circle 1504 corresponding to the ADF method. Also illustrated are inner circle 1502 and target phasor 1506.

Table 1 shows the maximum possible increase in output signal range for both phasor-splitting methods (ADF and RDF) for a multiple-IQ-channel phasing transmitter. For comparison, the corresponding gain in the coherent summation-based transmitter is also indicated.

TABLE 1

Maximum possible gain in output signal range for different number of channels

| | Maximum possible gain in output signal range (dB) | | |
|---|---|---|---|
| Number of IQ channels | All Degrees of Freedom method | Reduced Degrees of Freedom method | Coherent summation-based transmitter |
| 2 | 7.66 | 6.56 | 6.02 |
| 3 | 11.44 | 10.34 | 9.54 |
| 4 | 14.03 | 12.93 | 12.04 |
| 5 | 16.01 | 14.91 | 13.98 |
| 6 | 17.61 | 16.51 | 15.56 |
| 7 | 18.96 | 17.86 | 16.90 |
| 8 | 20.12 | 19.02 | 18.06 |
| 9 | 21.16 | 20.06 | 19.08 |
| 10 | 22.08 | 20.98 | 20.00 |

Exemplary Implementations

Figure 16:
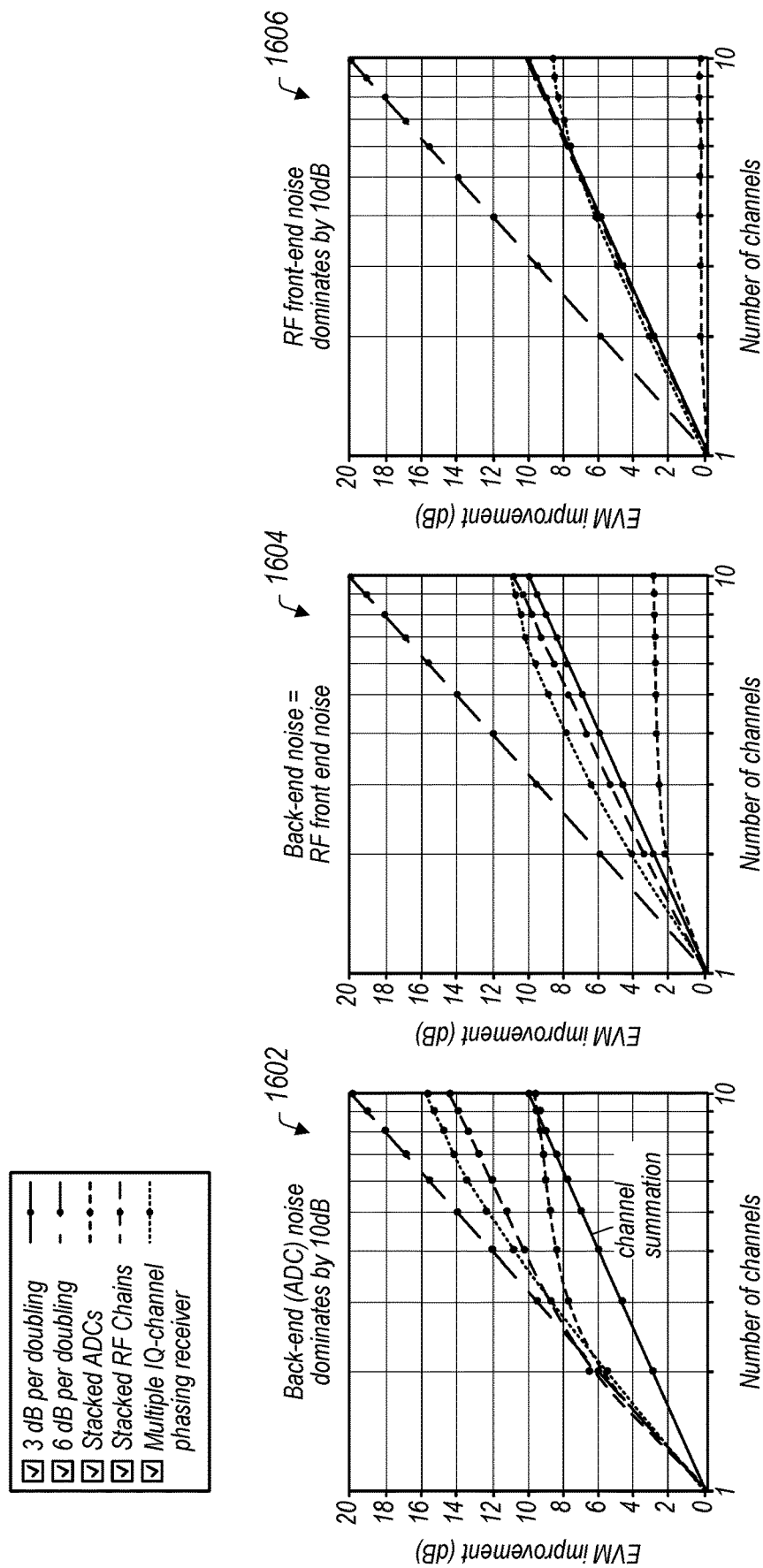
FIG. 16 shows diagrams illustrating simulation results for a multiple-IQ-channel phasing receiver, showing the EVM improvement in comparison to current state-of-the-art multi-channel receivers, according to some embodiments.

In an exemplary receiver simulation, an ideal transmitted signal was processed by a multiple-IQ-channel phasing receiver. For the baseline simulation, only the noise sources in the RF channels and ADCs were considered. FIG. 16 shows the simulation results for an example wireless local area network (WLAN) transmit signal with a peak-to-average power ratio (PAPR) of about 11 dB. For the simulation, noise added by the ADC (back-end) and the RF front-end was simulated. In the three graphs, 1602, 1604, and 1606, the relative levels of the ADC back-end and RF front-end noise are different. Graph 1602 illustrates the performance for the case of the back-end noise being 10 dB higher than the RF front-end noise. Graph 1604 illustrates the performance for the case of the back-end noise and the RF front-end noise being equal. Finally, graph 1606 illustrates the performance for the case of the RF front-end noise being 10 dB higher than the back-end noise. The receiver error vector magnitude (EVM) serves as a key performance indicator (KPI) to evaluate the performance of the novel phasing receiver approach. For a given number N of receive channels, the EVM improvement is shown in comparison to the EVM of a single channel receiver. For comparison purposes, the diagram also contains simulation results for the current state-of-the art multi-channel receivers described in FIG. 4 (curve labeled "Stacked ADCs" in FIG. 16), FIG. 5 (curve labeled "Stacked RF chains" in FIG. 16), and the special case of coherent channel combining receiver (curve labeled "3 dB per doubling" in FIG. 16).

As can be seen from the diagrams in FIG. 16, the novel multiple IQ-channel phasing receiver is able to outperform the state-of-the-art multiple channel receivers in multiple scenarios. In the case where the RF front-end noise becomes dominant (1606), the novel multiple IQ-channel phasing receiver is still as good as the other state-of-the-art multiple channel receivers.

Figure 17:
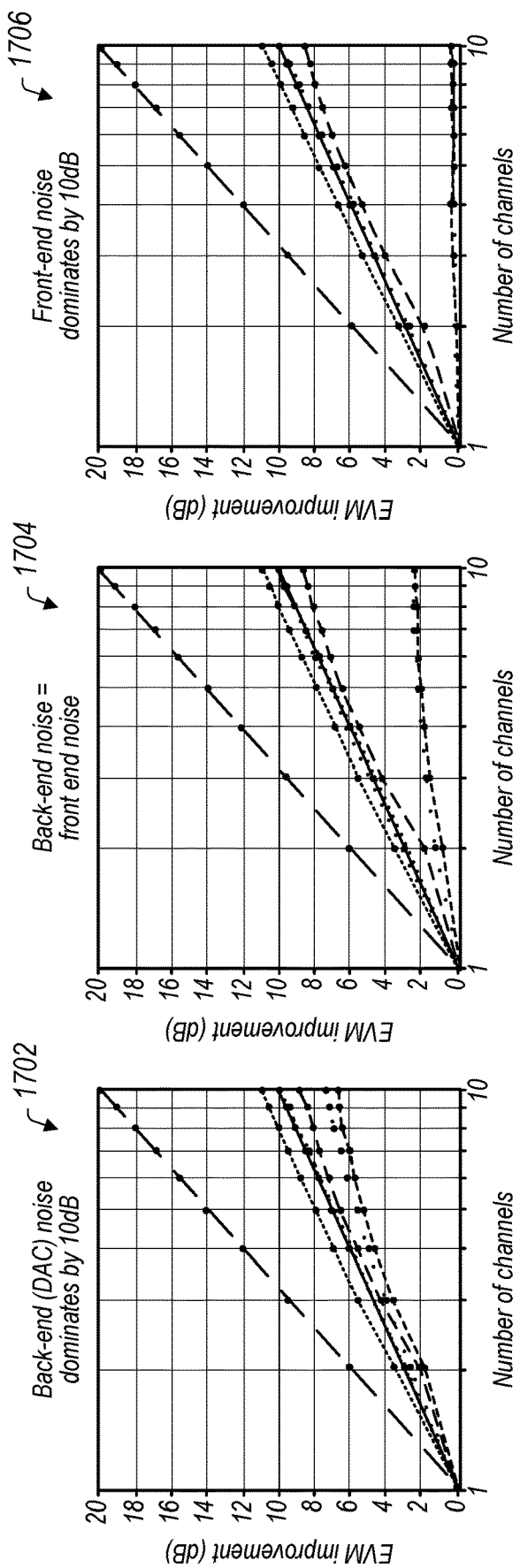
FIG. 17 shows diagrams illustrating simulation results for a multiple-IQ-channel phasing transmitter, showing the EVM improvement in comparison to current state-of-the-art multi-channel receivers, according to some embodiments.

In an exemplary transmitter simulation similar to the simulation of the novel multiple-IQ-channel receiver approach, the noise sources in the RF channels and DACs were considered as impairments and the EVM improvement compared to the single channel transmitter was used as performance KPI. The same type of WLAN test signal with PAPR ~11 dB was used, and simulation results for the state-of-the-art multi-channel transmitters are provided in FIG. 17 for comparison purposes. Similar to the simulation results shown in FIG. 16, the three graphs, 1702, 1704, and 1706, represent simulation results for different respective relative levels of the DAC back-end noise and RF front-end noise. Graph 1702 illustrates the performance for the case of the back-end noise being 10 dB higher than the RF front-end noise. Graph 1704 illustrates the performance for the case of the back-end noise and the RF front-end noise being equal. Finally, graph 1706 illustrates the performance for the case of the RF front-end noise being 10 dB higher than the back-end noise. As can be seen from the diagrams in FIG. 17, the novel multiple-IQ-channel phasing transmitter (curve labeled "multiple-IQ-channel phasing transmitter" in FIG. 17) outperforms the state-of-the-art multi-channel receivers in all simulated scenarios, even in the case when the RF front-end noise becomes dominant (1706). It should be noted that this simulation considers only the RDF phasor splitting method for the multiple IQ-channel phasing transmitter. Initial considerations indicate that the ADF phasor splitting approach might provide an additional EVM gain of about 1.1 dB.

In some embodiments, a transceiver may be designed to include a multi-channel (or multiple-channel) phasing transmitter as described above, and a multi-channel (or multiple-channel) phasing receiver as also described above. Furthermore, various devices, instruments, and/or systems employing transmitters and/or receivers may be designed to include embodiments of the multi-channel (or multiple-channel) phasing transmitter as described above, and/or a multi-channel (or multiple-channel) phasing receiver as also described above.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A multiple-channel phasing receiver comprising:
   a splitter circuit configured to split an input signal into a plurality of signals;
   a plurality of single-channel receivers configured to provide a corresponding plurality of intermediate signals, each single-channel receiver of the plurality of single-channel receivers having:
     an input configured to receive a corresponding respective signal of the plurality of signals; and an output configured to provide a corresponding respective intermediate signal of the plurality of intermediate signals, wherein the respective intermediate signal is a function of at least:
the corresponding respective signal; and
a corresponding respective phase of a plurality of phases of a local oscillator signal; and
a digital signal processor configured to combine the plurality of intermediate signals into a single output signal;
wherein the plurality of phases of the local oscillator signal is distributed over $\pi/2$ radians.

2. The multiple-channel phasing receiver of claim 1, wherein the corresponding respective intermediate signal is further a function of at least one of:
a total gain applied to the corresponding respective signal; or
a signal frequency of the local oscillator signal.

3. The multiple-channel phasing receiver of claim 2, wherein a value of the total gain is determined such that it compensates for a loss due to the splitter circuit.

4. The multiple-channel phasing receiver of claim 1, wherein at least one single-channel receiver of the plurality of single-channel receivers includes one of:
a direct conversion receiver; or
a heterodyne receiver.

5. The multiple-channel phasing receiver of claim 4, wherein the heterodyne receiver features one of:
a non-zero intermediate frequency (IF);
a last stage that uses a low IF; or
a last stage that uses a zero IF.

6. The multiple-channel phasing receiver of claim 1, wherein the multiple-channel phasing receiver is configured to operate on complex signals centered around an intermediate frequency.

7. The multiple-channel phasing receiver of claim 1, wherein the plurality of phases of the local oscillator signal includes an arbitrary starting phase.

8. The multiple-channel phasing receiver of claim 1, wherein each single-channel receiver includes a single in-phase/quadrature (IQ) channel.

9. The multiple-channel phasing receiver of claim 1, wherein the single output signal is a digital representation of the input signal.

10. The multiple-channel phasing receiver of claim 1, wherein distributing the plurality of phases of the local oscillator signal and performing digital to analog conversion in the plurality of single-channel receivers enables a higher input signal range for analog to digital conversion without signal information loss in the single output signal, relative to a full-scale input signal range of a single respective analog to digital converter used in each single-channel receiver.

11. The multiple-channel phasing receiver of claim 1, wherein the plurality of intermediate signals being combined into a single output signal provides additional signal-to-noise ratio gain for the multiple-channel phasing receiver.

12. A multiple-channel phasing transmitter comprising:
a phasor splitter configured to split an input signal into a plurality of signals;
a plurality of single-channel transmitters configured to provide a corresponding plurality of intermediate signals, each single-channel transmitter of the plurality of single-channel transmitters having:
an input configured to receive a corresponding respective signal of the plurality of signals; and
an output configured to provide a corresponding respective intermediate signal of the plurality of intermediate signals, wherein the respective intermediate signal is a function of at least:
the corresponding respective signal; and
a corresponding respective phase of a plurality of phases of a local oscillator signal; and
a summing circuit configured to add the plurality of intermediate signals into a single output signal;
wherein the plurality of phases of the local oscillator signal is distributed over $\pi/2$ radians.

13. The multiple-channel phasing transmitter of claim 12, wherein the corresponding respective intermediate signal is further a function of at least one of:
a total gain applied to the corresponding respective signal; or
a signal frequency of the local oscillator signal.

14. The multiple-channel phasing transmitter of claim 12, wherein the plurality of phases of the local oscillator signal includes an arbitrary starting phase.

15. The multiple-channel phasing transmitter of claim 12, wherein each single-channel transmitter includes a single in-phase/quadrature (IQ) channel.

16. A transceiver comprising:
a multiple-channel phasing receiver circuit comprising:
a splitter circuit configured to split a receive signal into a plurality of first signals;
a plurality of single-channel receivers configured to provide a corresponding plurality of first intermediate signals, each single-channel receiver of the plurality of single-channel receivers having:
an input configured to receive a corresponding respective first signal of the plurality of first signals; and
an output configured to provide a corresponding respective first intermediate signal of the plurality of first intermediate signals, wherein the respective first intermediate signal is a function of at least:
the corresponding respective first signal; and
a corresponding respective phase of a first plurality of phases of a local oscillator signal; and
a digital signal processor configured to combine the plurality of first intermediate signals into a single output receive signal;
wherein the first plurality of phases of the local oscillator signal is distributed over $\pi/2$ radians; and
a multiple-channel phasing transmitter circuit comprising:
a phasor splitter configured to split a transmit signal into a plurality of second signals;
a plurality of single-channel transmitters configured to provide a corresponding plurality of second intermediate signals, each single-channel transmitter of the plurality of single-channel transmitters having:
an input configured to receive a corresponding respective second signal of the plurality of second signals; and
an output configured to provide a corresponding respective second intermediate signal of the plurality of second intermediate signals, wherein the respective second intermediate signal is a function of at least:
the correspond respective second signal; and
a corresponding respective phase of a second plurality of phases of the local oscillator signal; and
a summing circuit configured to add the plurality of second intermediate signals into a single output transmit signal;

wherein the second plurality of phases of the local oscillator signal is distributed over π/2 radians.

17. The transceiver of claim 16;
wherein the corresponding respective first intermediate signal is further a function of at least one of:
  a total gain applied to the corresponding respective first signal; or
  a signal frequency of the local oscillator signal; and
wherein the corresponding respective second intermediate signal is further a function of at least one or more of:
  a total gain applied to the corresponding respective second signal; or
  a signal frequency of the local oscillator signal.

18. The transceiver of claim 16, wherein either one or both of the first plurality of phases of the local oscillator signal and the second plurality of phases of the local oscillator signal include an arbitrary starting phase.

19. The transceiver of claim 16, wherein each single-channel transmitter includes a single in-phase/quadrature (IQ) channel and each single-channel receiver includes a single in-phase/quadrature (IQ) channel.

20. The transceiver of claim 16, wherein the multiple-channel phasing receiver circuit is configured to operate on complex signals centered around a non-zero intermediate frequency.

* * * * *